(12) United States Patent
Bigliardi

(10) Patent No.: US 7,876,645 B2
(45) Date of Patent: Jan. 25, 2011

(54) SYSTEM AND METHOD FOR DETECTING OBSTACLES FOR VEHICLES

(75) Inventor: Severino Bigliardi, San Paolo d'Enza (IT)

(73) Assignee: Meta System S.p.A., Reggio Emilia (IT)

( * ) Notice: Subject to any disclaimer, the term of this patent is extended or adjusted under 35 U.S.C. 154(b) by 466 days.

(21) Appl. No.: 11/989,572

(22) PCT Filed: Jul. 28, 2006

(86) PCT No.: PCT/IB2006/002069

§ 371 (c)(1),
(2), (4) Date: Jan. 28, 2008

(87) PCT Pub. No.: WO2007/012958

PCT Pub. Date: Feb. 1, 2007

(65) Prior Publication Data

US 2010/0149923 A1   Jun. 17, 2010

(30) Foreign Application Priority Data

Jul. 29, 2005   (IT)   .................. MO2005A0199

(51) Int. Cl.
 G01S 15/93   (2006.01)
 G01S 15/52   (2006.01)
(52) U.S. Cl. .................. 367/100; 367/107; 367/116

(58) Field of Classification Search ............. 367/902, 367/100, 107, 116
See application file for complete search history.

(56) References Cited

U.S. PATENT DOCUMENTS

| 5,235,315 | A | 8/1993 | Cherry et al. |
| 6,100,796 | A | 8/2000 | Wagner et al. |
| 6,226,226 | B1 | 5/2001 | Lill et al. |
| 6,861,972 | B2 | 3/2005 | Britton et al. |
| 2006/0254142 | A1* | 11/2006 | Das et al. ................ 49/26 |
| 2007/0008819 | A1* | 1/2007 | Diessner et al. ........... 367/99 |
| 2010/0149923 | A1* | 6/2010 | Bigliardi ................. 367/100 |

FOREIGN PATENT DOCUMENTS

WO   WO 2007012958 A2 *   2/2007

\* cited by examiner

*Primary Examiner*—Dan Pihulic
(74) *Attorney, Agent, or Firm*—Dykema Gossett PLLC

(57) ABSTRACT

The present invention refers to a system for detecting obstacles for vehicles, comprising at least one sensor able to transmit a detection signal and to receive an echo signal reflected off at least one obstacle, means of parametric evaluation of said received echo signal which comprise means of comparison between at least two successive echo signals for the determination of a reference echo signal able to define the position of at least one fixed obstacle with respect to said at least one sensor.

16 Claims, 1 Drawing Sheet

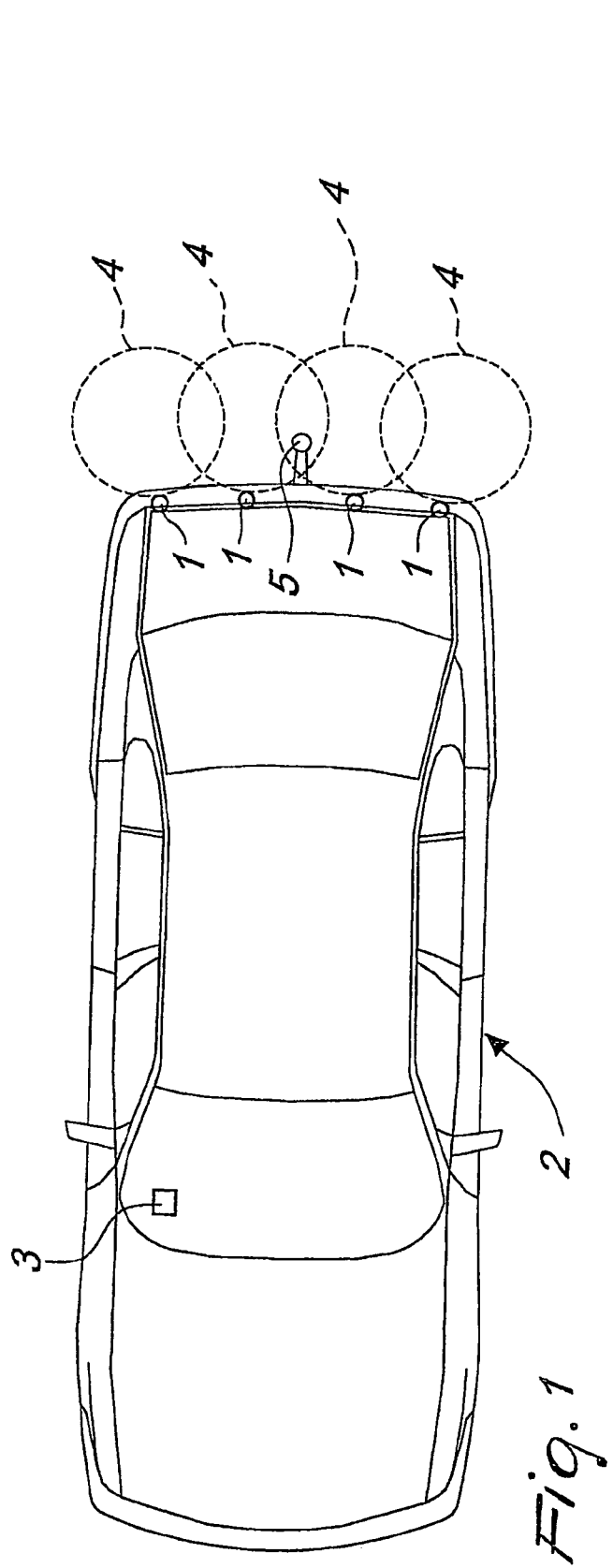
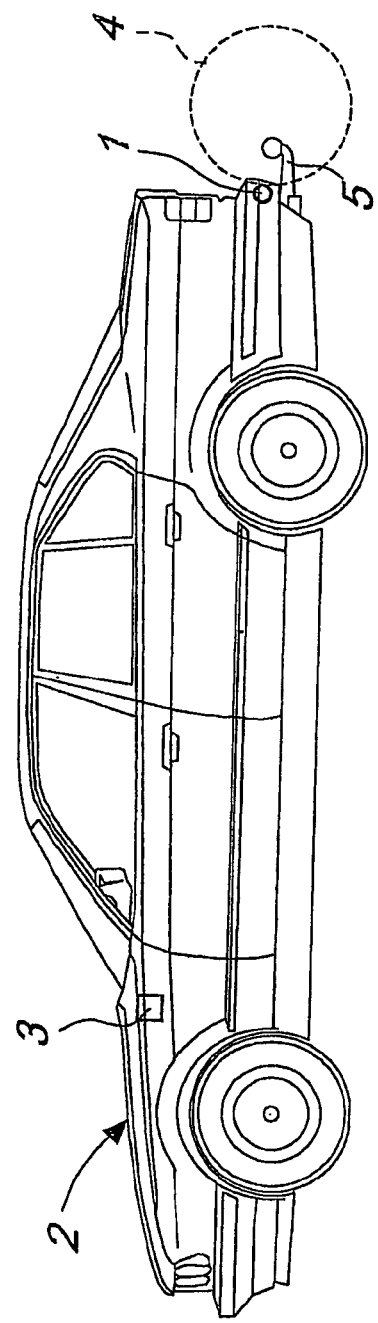

SYSTEM AND METHOD FOR DETECTING OBSTACLES FOR VEHICLES

TECHNICAL FIELD

The subject of this invention is a system and a method for detecting obstacles for vehicles, especially as a parking aid.

During specific vehicle manoeuvres, such as parking operations, it is hard for the driver to precisely define the distances between the vehicle and any obstacles, especially when reversing.

To this must be added the fact that the possibility exists of some obstacles not being visible to the driver due to their being located out of sight such as, for instance, the case of poles of such height as to be hidden, during the manoeuvre, by the body of the vehicle itself.

BACKGROUND ART

To overcome such problems, the use is known of obstacle detection systems able to make the above manoeuvres easier and, more specifically, able to exactly determine the distance between the vehicle and the obstacles located along its path.

The detection systems comprise sensor means, generally consisting in a series of active sensors of the ultrasonic type, in which each sensor features piezoelectric capsules able to transmit a sound signal consisting in a series of pulses (bursts) transmitted inside a preset range of action.

Any obstacles inside the range of action create a reflected echo signal which is then received by the piezoelectric capsules.

The echo signal received this way and which falls within a specific time window, is compared with a threshold signal correlated at the minimum distance allowed between the vehicle and an obstacle; in the event of this threshold signal being exceeded by the received echo signal, the sensor sends a warning signal to a control unit which converts it into a signal that can be heard by the driver.

It is of crucial importance to eliminate or restrict the possibility of wrong signals to the driver due to the detection of objects that are too far away or to the detection of special conformations and protrusions of the car, such as, for example, a towing hook fastened behind the vehicle, special types of bumper bars or spoilers, spare tyres secured behind off-road vehicles, etc.

For this purpose, sensor regulation is known at the time of installation so as to exclude any vehicle protrusions from their range of action.

Also known is the definition of the time window in which the received echo signal is considered useful for comparison with the threshold signal, so as to exclude the detection of objects that are too far away or too close.

These known detection systems are not however without drawbacks, among which the fact that any modifications to the vehicle following sensor installation, such as the fitting of a tow hook, requires new calibration of the system by direct intervention on the sensors.

Moreover, a reduction in the extension of the useful time window, so as to exclude the echo signal due, for example, to the tow hook, considerably restricts the range of action of the sensors, with the risk of the vehicle knocking against obstacles not detected by the system.

DISCLOSURE OF THE INVENTION

The main aim of this invention is to eliminate the known-technology drawbacks complained of above, by excogitating a system for detecting obstacles, particularly as regards systems for facilitating vehicle parking, which permits correct detection avoiding false signals due to special conformations or structural protrusions of the vehicle.

Another purpose of the invention in question is to allow structural modifications of the vehicle, avoiding subsequent sensor calibration operations aimed at changing or limiting the range of action of the sensors themselves.

As part of such technical aim, another purpose of the present invention is to achieve the previous aims with a simple structure, of relatively practical implementation, safe use and effective operation, as well as of a relatively low cost.

This aim and these purposes are all achieved by this system for detecting obstacles for vehicles, comprising at least one sensor able to transmit a detection signal and to receive an echo signal reflected off at least one obstacle and means of parametric evaluation of said received echo signal, characterised by the fact that the means of parametric evaluation comprise means of comparison between at least two successive echo signals for the determination of a reference echo signal able to define the position of at least one fixed obstacle with respect to said at least one sensor.

The set aim and purposes are further achieved by a method for detecting obstacles, comprising the phases consisting in transmitting at least one detection signal at least one sensor; detecting an echo signal reflected by at least one obstacle and received by said at least one sensor, characterized by the fact that it comprises the phases consisting in comparing said reflected echo signal with a reference echo signal; generating a user device control signal, in case of any difference between said echo signal and said reference echo signal above a preset threshold value.

BRIEF DESCRIPTION OF THE DRAWINGS

Further characteristics and advantages of this invention will appear even more evident from the detailed description of a preferred, but not exclusive, form of embodiment of a system and a method for detecting obstacles, illustrated by way of non limiting example in the accompanying drawings, wherein:

FIG. 1 is a plan view showing the system for detecting obstacles according to the invention fitted to a motor vehicle;

FIG. 2 is a side view showing the system for detecting obstacles according to the invention fitted to a motor vehicle;

WAYS OF CARRYING OUT THE INVENTION

The illustrated system is described with particular, but not exclusive, reference to its application for the detection of obstacles able to give assistance when parking a motor vehicle. The extension of the application is not however excluded as regards the detection of presences inside environments in general. With particular reference to the above figures, the system for detecting obstacles comprises at least one sensor, indicated by reference numeral 1, which is able to transmit a detection signal and to receive an echo signal generated by the reflection of the detection signal on at least one obstacle.

Suitably, the system comprises a series of sensors 1 that are fastened at the back and/or front of a motor vehicle 2, at a certain distance from each other and, particularly, on the rear and/or front bumper bar or, alternatively, fastened to the license plate frame support.

Preferably, the sensors 1 are installed on the rear bumper bar, with the detection and echo signal emission/reception surface facing onto a suitably sized obstacle detection area at the rear of the vehicle.

In particular, the detection area is defined by all the single fields of action of the sensors 1, indicated in the above figures with reference numeral 4.

Each of the sensors 1 is connected to a control unit 3 installed on the motor vehicle 2.

The sensors 1 used are of the receiver/transmitter type or, alternatively, comprise a transmitter element featuring detection signal transmission means and a distinct receiver element featuring echo signal reception means.

In particular, the sensors 1 are preferably of the sound type acting within the ultrasonic frequency spectrum, of the sealed type and with asymmetric emission lobe. Other forms of embodiment are not excluded with non-sealed ultrasonic sensors 1 featuring symmetric emission lobe.

Alternatively, sensors 1 of an optical type are used, preferably infra-red, or sensors 1 of the electromagnetic type, preferably microwave.

Each sensor 1 is able to emit, at preset time intervals, an ultrasonic detection signal consisting of a finite sequence of sound waves, and is able to receive the echo signal generated by the reflection of the detection signal off any obstacles placed inside the relevant field of action 4.

The system also comprises means for the parametric evaluation of the received echo signal which comprise means of comparison between at least two echo signals received by sensors 1 at subsequent moments for the determination of a reference echo signal able to define the position of at least one fixed obstacle with respect to sensors 1.

Such fixed obstacle generally consists of a protrusion on motor vehicle 2 and can be defined, for example by a tow hook fastened to the rear of motor vehicle 2, indicated in the figures by reference numeral 5.

In particular, the comparison is made by the system at regular time intervals and requires the analysis of a finite sequence of echo signals received at subsequent time intervals, for the determination of the position of at least one obstacle and its variation within a determined time window.

In the event of the sensors 1, within such time window, detecting a constant position in time of at least one fixed obstacle with respect to motor vehicle 2 and, at the same time, the position of at least a second obstacle, always with respect to motor vehicle 2 and at the same time window, is variable in time, then the reference echo signal is determined according to the echo signal generated by such fixed obstacle.

Alternatively or as further support to the above-described method of determining the reference echo signal, the means of comparison comprise means of analysis of an odometric signal able to determine the movement of vehicle 2. In case of detection by the sensors 1 of at least one obstacle with a constant position in relation to motor vehicle 2, with reference to a specific time window, and in the case of contemporaneous detection, by means of such odometric signal, of the movement of vehicle 2, then the reference echo signal is determined according to the echo signal generated by such obstacle, which is considered fixed with respect to vehicle 2.

Further procedures are not excluded for determining the reference echo signal which involve the storing of a received echo signal when the system is switched on and, generally, when this is installed on motor vehicle 2.

The means of parametric evaluation also comprise a micro-controller and memory means suitable for storing the reference echo signal, suitably amplified and rectified.

The means of parametric evaluation comprise means of verification able to determine the difference between the stored reference echo signal and an echo signal received afterwards and to make a comparison between such difference and at least one predefined threshold value.

In case of no obstacle entering the detection area, the echo signals received from periodical and successive transmissions will be of stable shape and consistent with the reference echo signal shape.

If, on the other hand, there is an obstacle inside the detection area, the modulation envelope of the received echo signal changes over time between one transmission and the next.

These alterations are evaluated by the micro-controller which, according to a specific algorithm, determines whether the difference between the reference echo signal and the received echo signal is greater than the threshold value and, in this case, it activates means for generating a control signal of at least one user device connected downstream of the sensors 1.

Advantageously, variable parameters are envisaged for evaluating the weight of the reference echo signal in calculating the above difference, able to determine the difference in a more or less sensitive way with respect to said reference echo signal.

The weight of said reference echo signal in calculating the above difference is, preferably, higher in the case of the reference echo signal being determined by the comparison between a sequence of echo signals simultaneous with the movement of the vehicle compared to the case in which this is determined by the comparison between a sequence of echo signals with motor vehicle stopped and the presence of at least one second moving object.

The user device comprises visual or sound indicator means for indicating whether or not there is an obstacle inside the detection area and/or its relevant distance with respect to the sensors 1 (and consequently with respect to the rear bumper bar of the motor vehicle).

In particular, knowing that sound has a predefined speed (around 340 m/s), and knowing the time interval defined between the transmission of the detection signal and the reception of the respective echo signal, the micro-controller calculates the relative distance between the obstacle and the motor vehicle and notifies this to a user by means of a monitor located on the dashboard of the motor vehicle.

Practically speaking, it has been ascertained how the described invention achieves the intended purposes, and in particular it is emphasised that the determination and storing of a reference echo signal made by the system and its comparison with the echo signals subsequently received, allows correct detection by the system, making this insensitive to the particular structural conformation of the vehicle and preventing erroneous signalling due to the presence of any protruding elements.

Furthermore, the capacity of the system to self-adapt due to the ongoing analysis and comparison of the received echo signals for modification of the reference echo signal, permits avoiding manual interventions on the system after its installation on the vehicle, following structural alterations such as for instance the fitting of a tow hook behind the motor vehicle.

Advantageously, another use of the system for detecting obstacles described above relates to the control of automatisms able to close and open at command the hood and/or boot of a motor vehicle.

In particular, the system can be used together with currently known systems for the automated opening and closing of the boot of a motor vehicle.

In such case, the system comprises activation means for storing a reference echo signal defining the position of a user near to the boot at or after boot opening. Subsequently, the system detects the received echo signal at regular time intervals to compare this with the reference echo signal.

If the user moves away from the boot, for example after an object has been taken from or placed in the boot, the difference between the reference echo signal and the echo signals subsequently received is not contained within a suitably defined predetermined threshold value and the means of comparison send a signal to a user device able to automatically close the boot.

In particular, the safety device comprises means for closing the boot that can only be started after a suitably set time interval and after the user has moved away from the boot.

This frees the user from having to close the boot, which is particularly useful in the case of the user having both hands engaged due to taking an object from the boot.

The invention thus conceived is susceptible of numerous modifications and variations, all of which falling within the scope of the inventive concept. Furthermore all the details can be replaced with others that are technically equivalent.

In practice, the materials used, as well as the shapes and dimensions, may be any according to requirements without because of this moving outside the protection scope of the following claims.

The invention claimed is:

1. A system for detecting obstacles for vehicles, comprising:
   at least one sensor (1), fastened on a motor vehicle (2), able to transmit a detection signal and to receive a corresponding echo signal reflected off at least one obstacle; and
   means associated with said at least one sensor (1) of parametric evaluation of said received echo signal; wherein said means of parametric evaluation in turn comprising:
   comparison means for comparing in a determined time window at least two successive echo signals received by the sensor (1) so as to determine a reference echo signal able to define the position with respect to said at least one sensor (1) of at least one fixed obstacle (5) constituted by an integral part of the motor vehicle (2), and
   verification means for verifying the difference between said reference echo signal and the successive echo signals received by said sensor (1) and for making a comparison between said difference and at least one predefined threshold value,
   wherein in the event of position of one first obstacle, with respect to said at least one sensor (1), being constant in time within said determined time window, and, at the same time, in the event of position of one second obstacle, always with respect to said at least one sensor (1), being variable in time within said time window, said comparing means are able to determine said reference echo signal according to the position of said one first obstacle, and
   wherein said verification means are suitable for generating a control signal of at least one user device connected downstream of said sensor (1), when said difference is greater than said threshold value,
   whereby, in case of no obstacle entering into the detection area (4) of the sensor (1), said successive echo signals, received by the sensor (1), are consistent with said reference echo signal, and, in case of an effective obstacle, not constituted by any integral part of the vehicle, inside the detection area (4), said successive echo signals change over time and are compared with said echo reference signal, corresponding to said fixed obstacle, integral part of the motor vehicle, for verifying the difference between them and said echo reference signal and thereby generating said control signal, when said difference is greater than said threshold value.

2. The system according to claim 1, wherein said user device comprises indicator means for signalling the presence of said effective obstacle inside the detection area (4).

3. The system according to claim 2, wherein said indicator means are of the visual or sound type.

4. The system according claim 1, wherein said user device comprises automatic closing means for closing automatically the boot of a said motor vehicle after said system has stored a user reference echo signal defining the position of a user in the zone of said boot of the motor vehicle and has verified a difference, between the successive echo signals received by the sensor (1) and said user reference echo signal, indicating that said user moves away from the boot.

5. The system according to claim 1, wherein said means of parametric evaluation comprise memory means suitable for storing said reference echo signal.

6. The system according to claim 1, wherein said means of parametric evaluation comprise a micro-controller.

7. The system according to claim 1, wherein said comparison means comprise means of analysis of an odometric signal signalling the movement of the vehicle on which said at least one sensor (1) is installed,
   wherein in case of detection of at least one obstacle having a constant position with respect to the motor vehicle (2), within said determined time window, and of contemporaneous detection, by means of said odometric signal, of movement of the vehicle (2), said reference echo signal is determined according to the echo signal generated by said obstacle having a constant position.

8. The system according to claim 1, wherein said at least one sensor (1) is connected to at least one control unit (3).

9. The system according to claim 1, wherein said at least one sensor (1) is of the receiver/transmitter type.

10. The system according to claim 1, wherein said sensor (1) is a sensor of the ultrasonic type.

11. The system according to claim 1, wherein said sensor (1) is a sensor of the optical type.

12. The system according to claim 1, wherein said sensor (1) is a sensor of the electromagnetic type.

13. The system according to claim 1, a series of sensors (1).

14. The system according to claim 1, wherein the weight of said reference echo signal in calculating said difference is higher in the case in which said reference echo signal is determined by the comparison between a sequence of echo signals simultaneous with the movement of the vehicle, compared to the case in which said reference echo signal is determined by the comparison between a sequence of echo signals with said motor vehicle being stopped and in the presence of at least one moving object.

15. A method for detecting obstacles for vehicles, comprising the following steps:
   transmitting at least one detection signal at least one sensor (1), fastened on a motor vehicle (2);
   detecting at least one echo signal reflected by at least one obstacle, in a field of action (4) of said sensor (1), and received by said at least one sensor (1);
   comparing at least two successive echo signals so as to determine a reference echo signal able to define the position, with respect to said at least one sensor (1), of at least one fixed obstacle (5) constituted by an integral part of a motor vehicle (2), as for instance a tow hook (5) fastened to the rear of the motor vehicle (2),
   wherein, in the event of position of one first obstacle, with respect to said at least one sensor, being constant in time, and, at the same time, in the event of position of one second obstacle, always with respect to said at least one sensor, being variable in time, or of movement of said vehicle, said comparing phase determines said reference echo signal according to the constant position of said one first obstacle;

storing said reference echo signal, so determined;

verifying the difference between said reference echo signal and the successive echo signals received by said sensor (1); and generating a user device control signal, signalling the presence of an effective obstacle in the detection area (4) of said sensor (1), when said difference is greater than a preset threshold value.

16. The method according to claim 15, wherein said comparing phase comprises the analysis of the echo signals received by said sensor (1) within a determined time window.

* * * * *